(12) United States Patent
Tanaka

(10) Patent No.: US 11,151,431 B2
(45) Date of Patent: Oct. 19, 2021

(54) PRINTER AND COMPUTER-READABLE MEDIUM STORING COMPUTER-READABLE INSTRUCTIONS

(71) Applicant: BROTHER KOGYO KABUSHIKI KAISHA, Nagoya (JP)

(72) Inventor: Tsutomu Tanaka, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/752,907

(22) Filed: Jan. 27, 2020

(65) Prior Publication Data

US 2020/0242429 A1    Jul. 30, 2020

(30) Foreign Application Priority Data

Jan. 28, 2019  (JP) .............................. JP2019-012443

(51) Int. Cl.
   *G06F 15/00*    (2006.01)
   *G06K 15/02*    (2006.01)

(52) U.S. Cl.
   CPC ....... *G06K 15/1848* (2013.01); *G06K 15/021* (2013.01); *G06K 15/027* (2013.01); *G06K 2215/0011* (2013.01); *G06K 2215/0097* (2013.01)

(58) Field of Classification Search
   CPC ............. G06K 15/1848; G06K 15/021; G06K 15/027; G06K 2215/0011; G06K 2215/0097
   USPC ........................................................ 358/1.6
   See application file for complete search history.

(56) References Cited

U.S. PATENT DOCUMENTS

| 2001/0043345 | A1* | 11/2001 | Rumph | .............. | G06K 15/1848 |
| | | | | | 358/1.9 |
| 2008/0094651 | A1* | 4/2008 | Takahashi | ............. | G06F 3/1247 |
| | | | | | 358/1.13 |
| 2016/0094727 | A1 | 3/2016 | Sawada | | |
| 2018/0165046 | A1* | 6/2018 | Inoue | .................... | G06F 3/1238 |

FOREIGN PATENT DOCUMENTS

| JP | 9-325867 A | 12/1997 |
| JP | 2005-161819 A | 6/2005 |
| JP | 2011-34533 A | 2/2011 |
| JP | 2016-72785 A | 5/2016 |
| JP | 2017-73002 A | 4/2017 |

* cited by examiner

*Primary Examiner* — Mark R Milia
(74) *Attorney, Agent, or Firm* — Merchant & Gould P.C.

(57) ABSTRACT

A printer includes an input device for receiving an input operation to the printer from a user, a memory, a printing device, and a controller. The controller is configured to: receive print data from a terminal; in a case where the controller determines that the print data received from the terminal is raster data, determine whether a particular condition is met; in a case where the controller determines that the particular condition is met, send, to the terminal, request information that requests the terminal to send page description language (PDL) data; and, in a case where the controller receives the PDL data from the terminal after sending the request information to the terminal, allow the printing device to execute printing on a basis of the PDL data. The PDL data specifies types of drawing objects and drawing positions with commands.

7 Claims, 8 Drawing Sheets

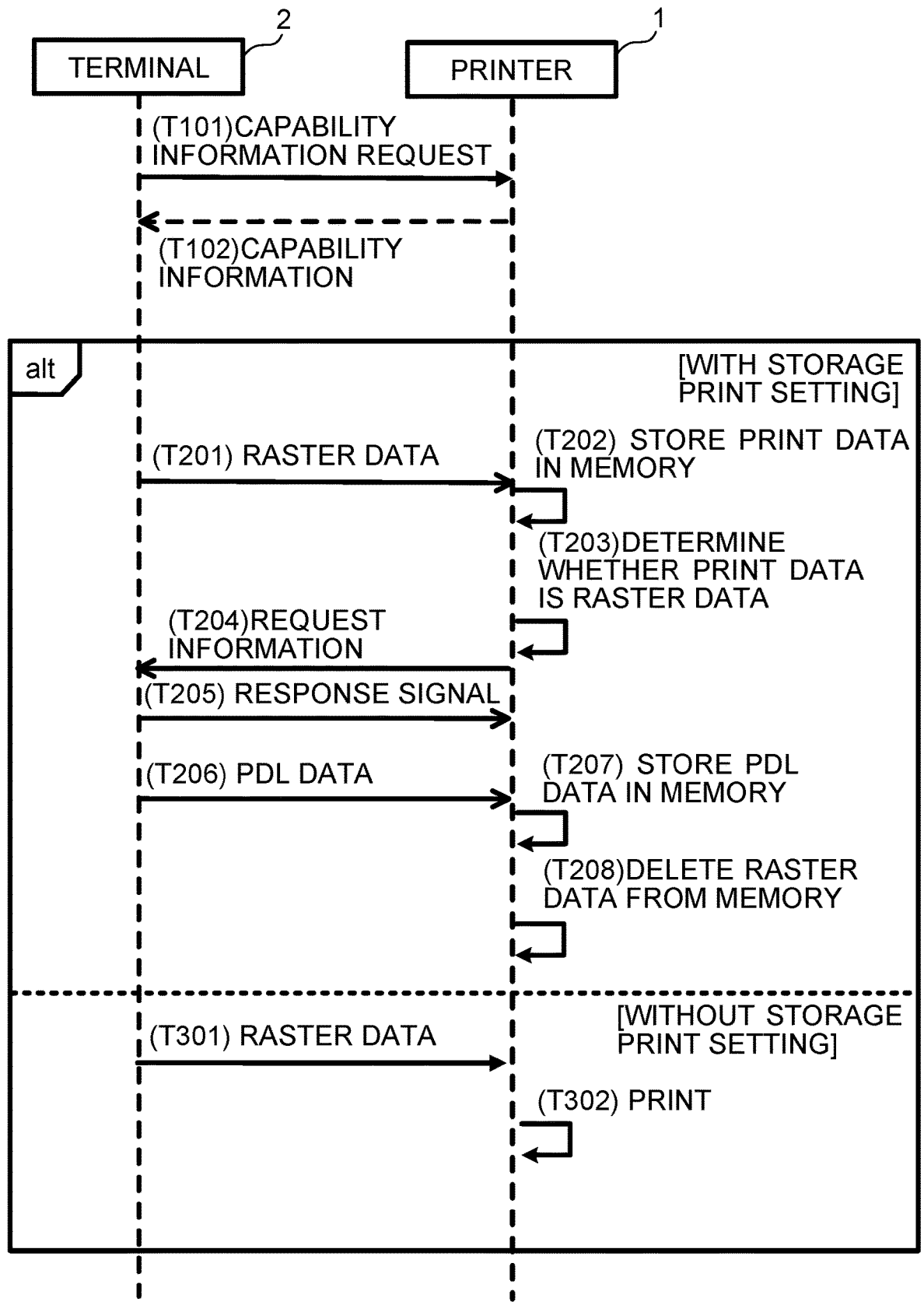

PRINTER AND COMPUTER-READABLE MEDIUM STORING COMPUTER-READABLE INSTRUCTIONS

CROSS-REFERENCE TO RELATED APPLICATION

This application claims priority from Japanese Patent Application No. 2019-012443 filed on Jan. 28, 2019, the content of which is incorporated herein by reference in its entirety.

TECHNICAL FIELD

Aspects of the disclosure relates to a printer and a non-transitory computer-readable medium storing computer-readable instructions for the printer.

BACKGROUND

A known printer carries out data communications with a terminal and executes printing in accordance with an instruction from the terminal. Upon receipt of a capability information request from the terminal, the printer sends, to the terminal, a capability notice including data format information which indicates available print data formats in the printer. The printer receives, from the terminal, print data pursuant to a data format included in the capability notice, and executes printing of an image represented by the print data.

SUMMARY

For example, in a case where the printer is capable of handling multiple print data formats, the terminal may select one from the data formats and send the print data in the selected data format to the printer. However, receiving the print data in a different data format may be desirable depending on a state of the printer including a print setting.

Aspects of the disclosure provide a technique that enables a printer to receive print data in a data format appropriate for a state of the printer from a terminal.

According to one or more aspects of the disclosure, a printer includes an input device for receiving an input operation to the printer from a user, a memory, a printing device, and a controller. The controller is configured to receive print data from a terminal. The controller is configured to, in a case where the controller determines that the print data received from the terminal is raster data, determine whether a particular condition is met. The controller is configured to, in a case where the controller determines that the particular condition is met, send, to the terminal, request information that requests the terminal to send page description language (PDL) data. The controller is configured to, in a case where the controller receives the PDL data from the terminal after sending the request information to the terminal, allow the printing device to execute printing on a basis of the PDL data. The PDL data specifies types of drawing objects and drawing positions with commands.

According to one or more aspects of the disclosure, a non-transitory computer-readable medium is provided in a printer. The printer includes an input device for receiving an input operation to the printer from a user, a memory, a printing device, and a controller. The non-transitory computer-readable medium stores computer-readable instructions. The computer-readable instructions, when executed by the controller of the printer, causes the controller to perform: receiving print data from a terminal; in a case where the controller determines that the print data received from the terminal is raster data, determining whether a particular condition is met; in a case where the controller determines that the particular condition is met, sending, to the terminal, request information that requests the terminal to send page description language (PDL) data; and in a case where the controller receives the PDL data from the terminal after sending the request information to the terminal, allowing the printing device to execute printing on a basis of the PDL data. The PDL data specifies types of drawing objects and drawing positions with commands.

BRIEF DESCRIPTION OF THE DRAWINGS

FIG. 8 is a sequence diagram of interaction between a terminal and a printer illustrated for when a print setting for the printer is set to a storage print setting and when the print setting for the printer is not set to the storage print setting.

DETAILED DESCRIPTION

Aspects of the disclosure will be described with reference to the accompanying drawings.

1. Configuration

Printing System Configuration

Figure 1:
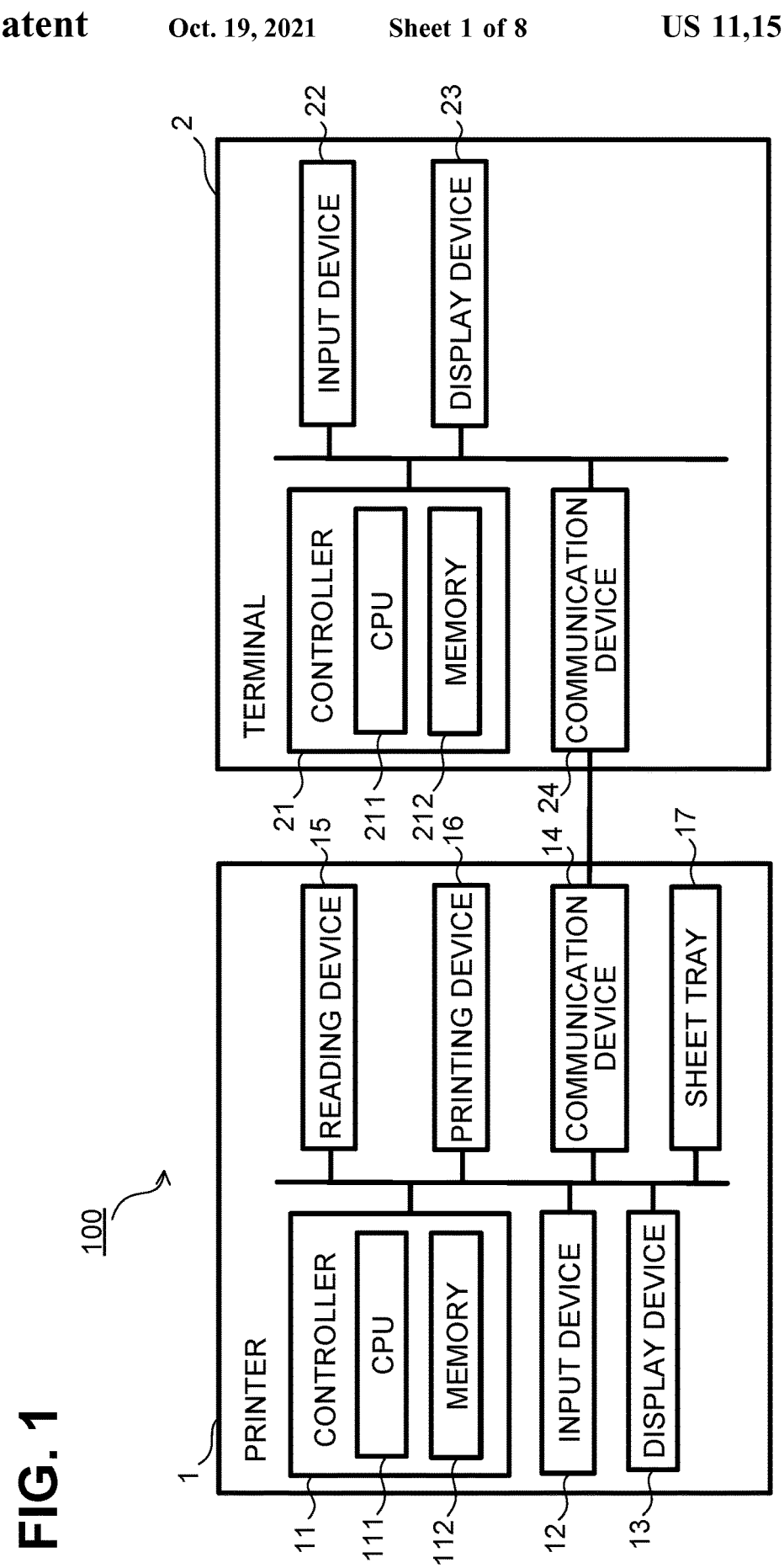
FIG. 1 is a block diagram illustrating a printing system configuration.

A printing system 100 illustrated in FIG. 1 includes a printer 1 and a terminal 2, which carry out data communications therebetween.

The printer 1 includes a controller 11, an input device 12, a display device 13, a communication device 14, a reading device 15, a printing device 16, and at least one sheet tray 17.

The controller 11 centrally controls each device of the printer 1 and includes a CPU 111 and a memory 112. The memory 112 is a semiconductor memory such as a RAM, ROM or flash memory. In other words, the printer 1 includes a microcomputer including the CPU 111 and the semiconductor memory.

The printer 1 has a variety of functions to be activated by the CPU 111 which basically carries out programs stored in the memory 112. The memory 112 stores print data sent from the terminal 2.

The input device 12 includes operation buttons to be used by a user for inputting commands to the printer 1.

The display device 13 is a device for displaying images, such as a liquid crystal display or an organic light-emitting diode display.

The communication device 14 is a communication interface for connecting the printer 1 to a network. The printer 1 may carry out, through the communication device 14, data communications with the terminal 2 and other external devices by wireline or wirelessly. The printer 1 may be connected to the Internet through the communication device 14 to carry out data communications with external devices on the Internet.

The reading device 15 includes an image sensor that reads an image on a document to generate image data of the read image.

The printing device 16 has an inkjet or electrophotographic printing mechanism and is capable of printing images on sheets.

The sheet tray 17 stores therein a stack of sheets for printing.

The terminal 2 is a general-purpose data processor such as a personal computer, a tablet terminal, or a smart phone. The terminal 2 includes a controller 21, an input device 22, a display device 23, and a communication device 24.

The controller 21 centrally controls each device of the terminal 2 and includes a CPU 211 and a memory 212. The memory 212 is a semiconductor memory such as a RAM, ROM or flash memory. In other words, the terminal 2 includes a microcomputer including the CPU 211 and the semiconductor memory.

The input device 22 is a device used by a user for inputting commands to the printer 1. Examples of the input device 22 include a keyboard and pointing devices such as a mouse and a touchpad.

The display device 23 is a device for displaying images, such as a liquid crystal display or an organic light-emitting diode display.

The communication device 24 is a communication interface for connecting the terminal 2 to a network. The terminal 2 may carry out, through the communication device 24, data communications with the printer 1 and other external devices by wireline or wirelessly. The terminal 2 may be connected to the Internet through the communication device 24 to carry out data communications with external devices on the Internet. The terminal 2 sends print data describing an image to print to the printer 1 through the communication device 24.

The print data includes printing conditions pertaining to printing. The printing conditions may include a type of sheet (such as plain, glossy, or photo) and a sheet size. The printing conditions may include a color setting (a color mode printing or monochrome mode printing), a number of print copies, a single-sided or double-sided printing setting, a range of pages to print and other information.

Printer Functions

The printer 1 executes printing with various print settings. In this embodiment, executable print settings for the printer 1 include a storage print setting and a test print setting.

The storage print setting is a print setting for which print data is stored in the memory 112 until a print instruction is input to the input device 12. Specifically, when the print setting is set to the storage printing setting, print data, which is received from the terminal 2 or another device, is stored in the memory 112 of the printer 1 without being immediately printed. The stored print data is printed when the user instructs the printer 1 to print.

The test print setting is a print setting for first printing only some of pages of the print data or some of copies of the print data for multiple copy printing, and then changing printing conditions or printing remaining pages or copies of the print data in accordance with a specified operation input through the input device 12. In this embodiment, when a print setting for the printer 1 is set to the test print setting, only a first page of the print data is printed first. Thereafter, printing conditions may be changed or a second or subsequent pages may be printed in accordance with a specified operation through the input device 12.

In this embodiment, the memory 112 of the controller 11 of the printer 1 stores a tray setting for a sheet tray 17. The tray setting includes a size of sheets stored in the sheet tray and a type of sheet (such as plain, glossy, or photo).

2. Data Processing Processes 2-1. Process at Receipt of Print Data

A process at receipt of print data executed by the controller 11 of the printer 1 will be described with reference to a flowchart in FIG. 2. The process at receipt of print data is repeatedly executed while the printer 1 is powered on.

At step S101, the controller 11 monitors whether the printer 1 receives print data from the terminal 2. If the printer 1 receives print data from the terminal 2, the controller 11 determines YES at S101 and goes to S102; otherwise the controller 11 repeats S101.

At S102, the controller 11 stores the print data received from the terminal 2 in the memory 112 and goes to S103.

At S103, if the controller 11 determines that the received print data is not raster data (S103: NO), the controller 11 goes to S104. When the controller 11 determines NO at S103, the received print data may be PDL data, which will be described later.

At S104, the controller 11 executes printing on the basis of the received print data. By executing printing, the controller 11 allows the printing device 16 to print the print data on a sheet. After S104, the controller 11 ends the process at receipt of print data illustrated in FIG. 2.

At S103, if the controller 11 determines that the received print data is raster data (S103: YES), the controller 11 goes to S105 and determines whether the print setting for the printer 1 is set to the storage print setting.

At S105, if the controller 11 determines that the print setting for the printer 1 is set to the storage print setting (S105: YES), the controller 11 goes to S106, executes a storage printing process, which will be described later, and then ends the process at receipt of print data illustrated in FIG. 2.

At S105, if the controller 11 determines that the print setting for the printer 1 is not set to the storage print setting (S105: NO), the controller 11 goes to S107 and determines whether printing of the received print data is set with a glossy sheet setting on the basis of settings for the printer 1.

At this time, the controller 11 identifies a sheet tray 17 storing sheets which meet a printing condition of the print data. If the printer 1 includes two or more sheet trays 17, the controller 11 may identify (or select) one sheet tray 17 storing sheets which meet a printing condition of the print data. If the printer 1 has a single sheet tray 17, the controller 11 may identify the sheet tray 17.

The controller 11 refers to a tray setting of the identified sheet tray 17 and determines whether a type of sheet, which is set in the tray setting, is glossy. If the type of sheet is glossy, the controller 11 determines that printing of the received print data is set with the glossy sheet setting. In contrast, if the type of sheet is not glossy, the controller 11 determines that printing of the received print data is not set with the glossy sheet setting. Alternatively, the controller 11 may determine that printing is set with the glossy sheet setting, not on the basis of the tray setting, but in a case where a print sheet setting included in the print data is set to the glossy sheet setting.

At S107, if the controller 11 determines that printing of the received print data is set with the glossy sheet setting (S107: YES), the controller 11 goes to S108, executes a glossy sheet printing process, which will be described later, and then ends the process at receipt of print data illustrated in FIG. 2.

At S107, if the controller 11 determines that printing of the received print data is not set with the glossy sheet setting (S107: NO), the controller 11 goes to S109 and determines whether the print setting for the printer 1 is set to a test print setting.

At S109, if the controller 11 determines that the print setting for the printer 1 is set to the test print setting (S109: YES), the controller 11 goes to S110, executes a test printing process, which will be described later, and then ends the process at receipt of print data illustrated in FIG. 2.

At S109, if the controller 11 determines that the print setting for the printer 1 is not set to the test print setting (S109: NO), the controller 11 goes to S111, and executes printing on the basis of the print data received at S101, that is, raster data.

Subsequently, at S112, the controller 11 determines whether an error has occurred during execution of printing at S111. Examples of an error in this step include a sheet jammed in the printing device 16, and running out of a consumable item (such as toner or sheets).

At S112, if the controller 11 determines that an error has occurred during execution of printing (S112: YES), the controller 11 goes to S113, executes a process at error occurrence, which will be described later, and then ends the process at receipt of print data illustrated in FIG. 2.

At S112, if the controller 11 determines whether no error has occurred during execution of printing (S112: NO), the controller 11 ends the process at receipt of print data illustrated in FIG. 2 without executing the process at error occurrence at S113.

2-1-1. Storage Printing Process

Next, the storage printing process executed by the controller 11 at S106 in FIG. 2 will be described with reference to a flowchart in FIG. 3.

At S201, the controller 11 executes a PDL data receiving process. PDL stands for page description language.

The PDL data receiving process is a process for receiving PDL data. PDL data specifies drawing objects such as text and graphics and drawing positions with commands described in PDL. Examples of PDLs include PostScript (a registered trademark) and PCL (a registered trademark; standing for Printer Control Language).

The PDL data receiving process will be described with reference to a flowchart in FIG. 4.

At S301, the controller 11 sends request information to the terminal 2 through the communication device 14. The request information is information to request sending of PDL data. The PDL data requested by the request information is PDL data describing the same image (that is, the same object to be printed) as that described by the raster data received at S101 in FIG. 2. That is, the controller 11 requests the terminal 2 to re-send the print data received at S101 in a PDL data format.

Subsequently, at S302, the controller 11 determines whether the printer 1 has received a response signal from the terminal 2 within a particular time after sending the request information at S301.

In other words, in this embodiment, upon receipt of the request information from the printer 1, the terminal 2 sends a response signal, which indicates the receipt of the request information, to the printer 1. Then, the terminal 2 sends PDL data to the printer 1 if the terminal 2 is able to send PDL data. The response signal includes information of whether the raster data is convertible into PDL data at the terminal 2.

At S302, if the controller 11 determines that the printer 1 has received a response signal from the terminal 2 within a particular time after sending the request information (S302: YES), the controller 11 goes to S303.

At S303, the controller 11 determines whether the raster data is convertible into the PDL data at the terminal 2 on the basis of the received response signal.

At S303, if the controller 11 determines that the raster data is convertible into the PDL data at the terminal 2 (S303: YES), the controller 11 goes to S304.

At S304, the controller 11 determines whether the printer 1 has received PDL data from the terminal 2 within a particular time after receiving the request information at S302.

At S304, if the controller 11 determines that the printer 1 has received PDL data from the terminal 2 within a particular time after receiving the request information (S304: YES), the controller 11 goes to S305.

Figure 4:
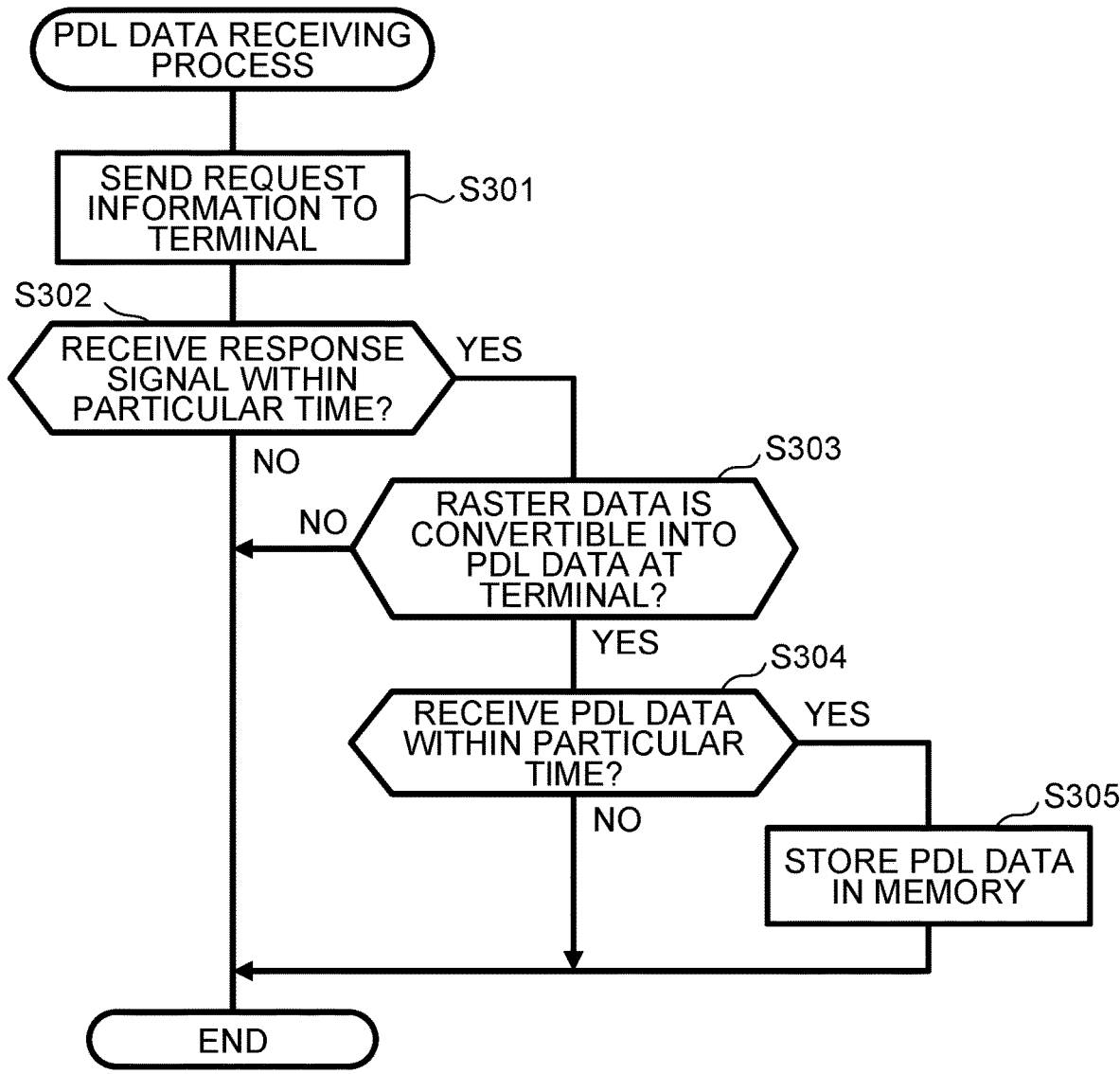
FIG. 4 is a flowchart of a PDL data receiving process.

At S305, the controller 11 stores the received PDL data in the memory 112, and then ends the PDL data receiving process illustrated in FIG. 4.

At S302, if the controller 11 determines that the printer 1 has not received a response signal from the terminal 2 within a particular time after sending the request information (S302: NO), the controller 11 ends the PDL data receiving process illustrated in FIG. 4 without executing S303 through S305. Potential causes of a failure in receipt of a response signal may include no power to the terminal 2 and poor network connection of the printer 1 or the terminal 2.

At S303, if the controller 11 determines that the raster data is not convertible into the PDL data at the terminal 2 (S303: NO), the controller 11 ends the PDL data receiving process illustrated in FIG. 4 without executing S304 and S305.

At S304, if the controller 11 determines that the printer 1 has not received PDL data from the terminal 2 within a particular time after receiving the response signal (S304: NO), the controller 11 ends the PDL data receiving process illustrated in FIG. 4 without executing S305. Potential causes of a failure in receipt of PDL data may include no power to the terminal 2 and poor network connection of the printer 1 or the terminal 2.

Figure 3:
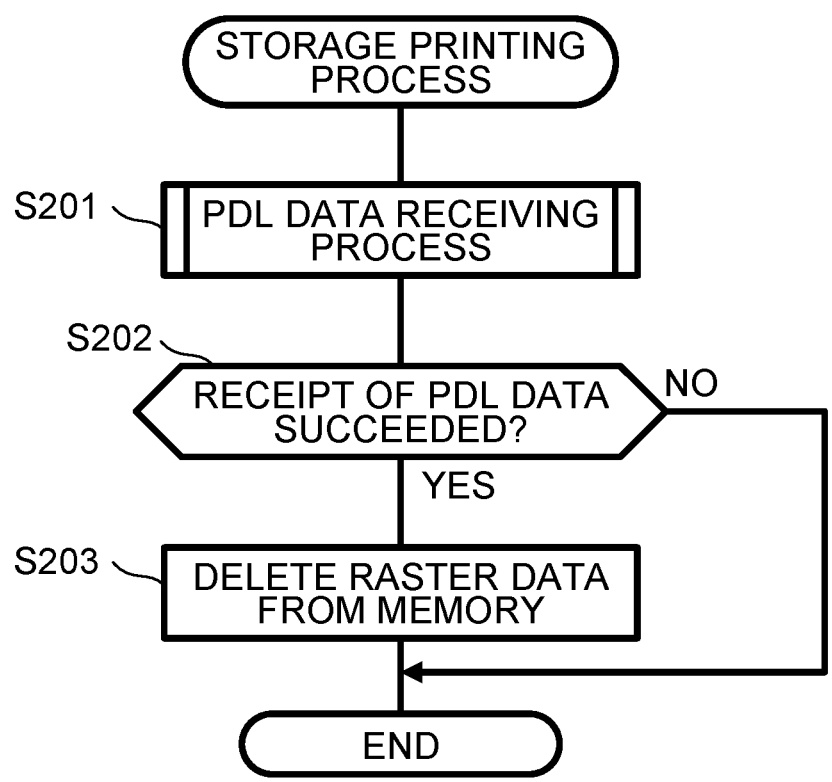
FIG. 3 is a flowchart of a storage printing process.

After ending the PDL data receiving process illustrated in FIG. 4, the controller 11 goes to S202 in FIG. 3.

At S202, the controller 11 determines whether the receipt of PDL data succeeded.

Specifically, at S304 in FIG. 4, if the controller 11 determines that the printer 1 has received PDL data within a particular time after receiving the response signal (S304: YES), the controller 11 determines that the receipt of PDL data succeeded.

If the controller 11 determines that, at S302, the printer 1 has not received a response signal from the terminal 2 within a particular time after sending the request information (S302: NO), determines that, at S303, raster data is not convertible into PDL data at the terminal 2 (S303: NO), or determines that, at S304, the printer 1 has not received a response signal form the terminal 2 within a particular time after receiving a response signal (S304: NO), the controller 11 determines that the receipt of PDL data has failed.

At S202 in FIG. 3, if the controller 11 determines that the receipt of PDL data succeeded (S202: YES), the controller 11 goes to S203, deletes the raster data stored at S102 in FIG. 2 from the memory 112, and then ends the storage printing process illustrated in FIG. 3.

At S202, if the controller 11 determines that the receipt of PDL data has failed (S202: NO), the controller 11 ends the storage printing process illustrated in FIG. 3 without executing S203.

In other words, if the receipt of PDL data succeeded, the PDL data is stored in the memory 112, while the raster data is deleted therefrom. If the receipt of PDL data has failed, the raster data remains stored in the memory 112.

2-1-2. Glossy Sheet Printing Process

Next, the glossy sheet printing process executed by the controller 11 at S108 in FIG. 2 will be described with reference to a flowchart in FIG. 5.

At S401, the controller 11 executes the PDL data receiving process illustrated in FIG. 4 described above.

Subsequently, at S402, the controller 11 determines whether the receipt of PDL data succeeded on the basis of a result of the PDL data receiving process.

At S402, if the controller 11 determines that the receipt of PDL data succeeded (S402: YES), the controller 11 goes to S403.

Figure 2:
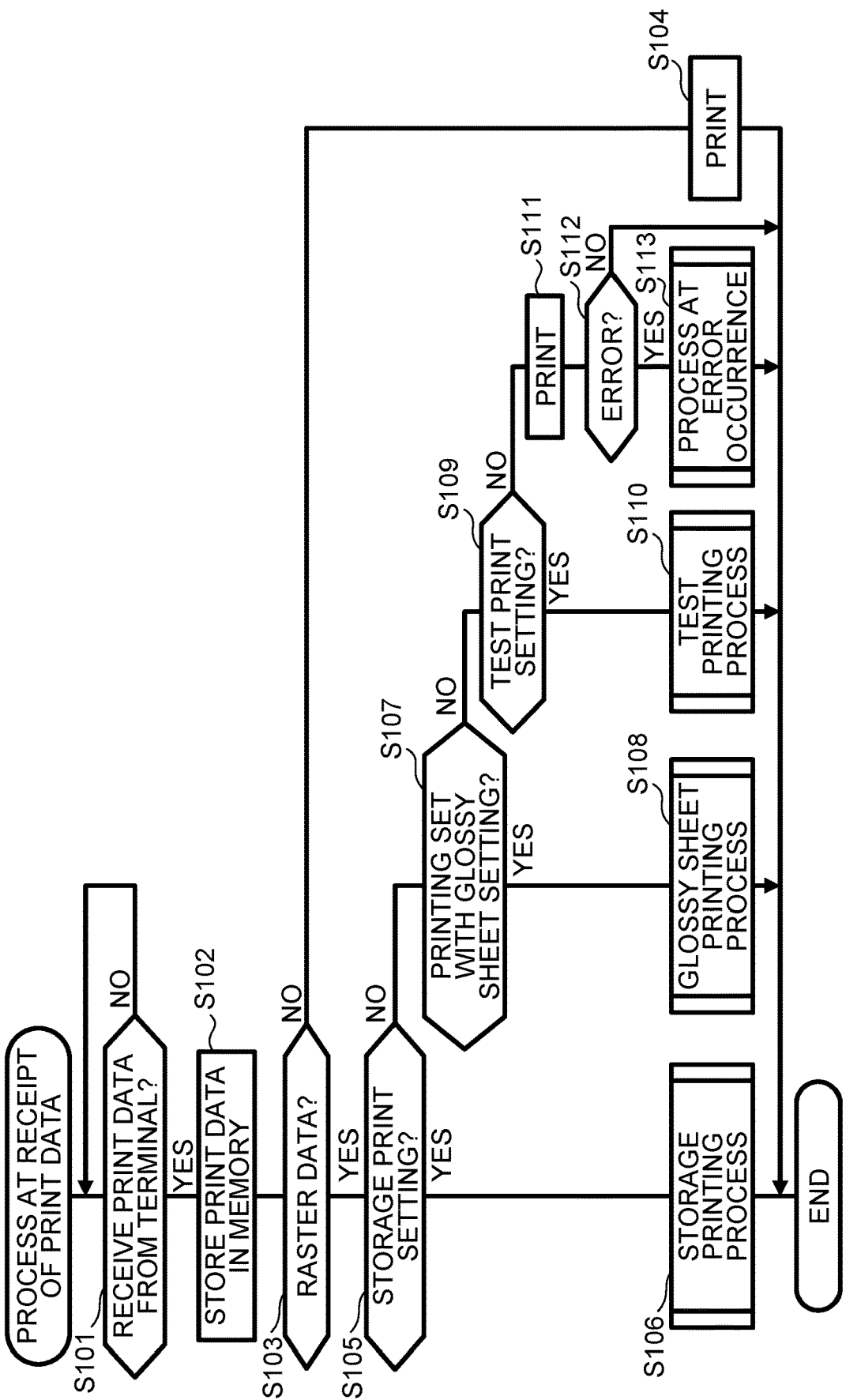
FIG. 2 is a flowchart of a process at receipt of print data.

At S403, the controller 11 deletes the raster data stored at S102 in FIG. 2 from the memory 112.

Subsequently, at S404, the controller 11 controls the printing device 16 to execute printing on the basis of the received PDL data. Specifically, the controller 11 generates raster data by applying a raster image processor (RIP) process, a known technique in the art, to the received PDL data, and controls the printing device 16 to execute printing on the basis of the generated raster data. After executing S404, the controller 11 ends the glossy sheet printing process illustrated in FIG. 5.

At S402, if the controller 11 determines that the receipt of PDL data has failed (S402: NO), the controller 11 goes to S405.

Figure 5:
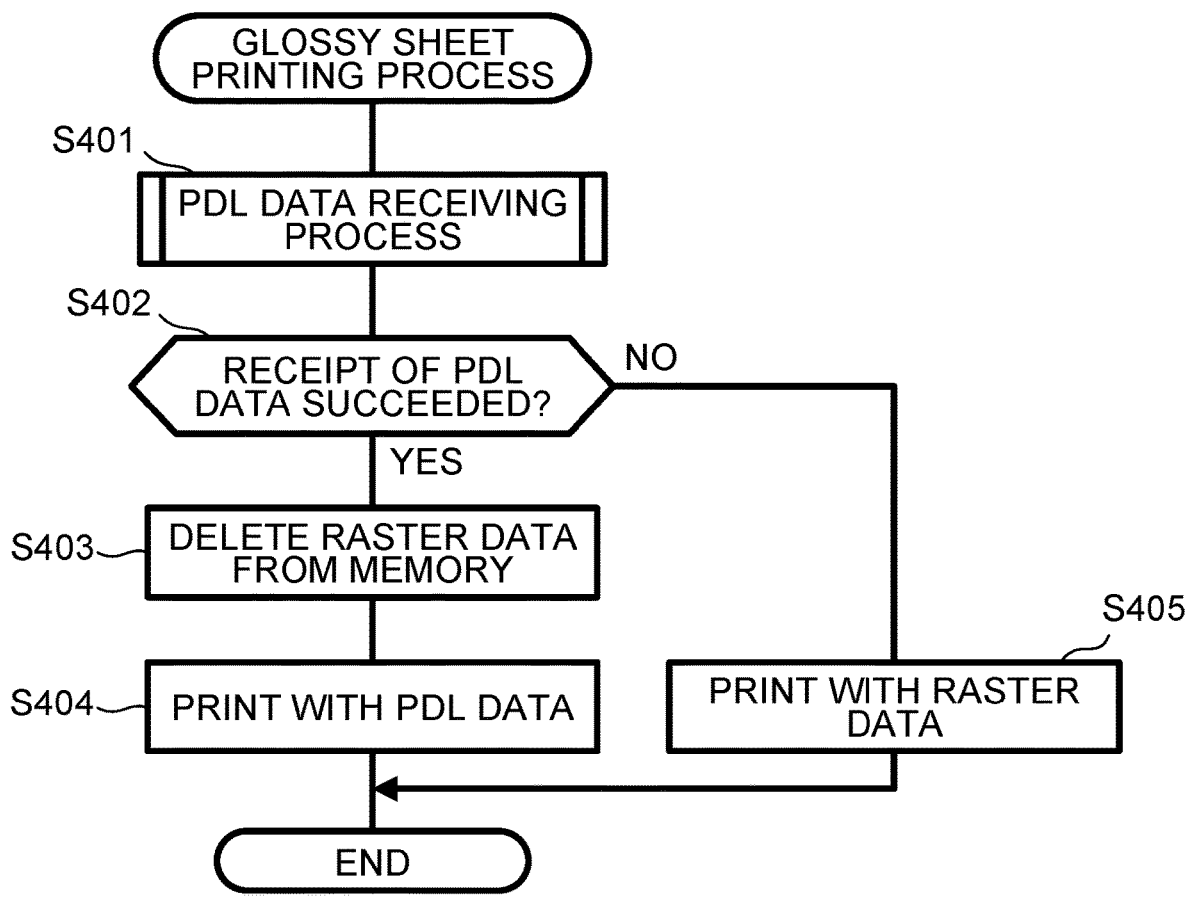
FIG. 5 is a flowchart of a glossy sheet printing process.

At S405, the controller 11 controls the printing device 16 to execute printing on the basis of the raster data stored in the memory 112 at S102, and then ends the glossy sheet printing process illustrated in FIG. 5.

In other words, if the receipt of PDL data succeeded, printing is executed on a glossy sheet on the basis of the PDL data, instead of the raster data. If the receipt of PDL data has failed, printing is executed on a glossy sheet on the basis of the raster data.

2-1-3. Test Printing Process

Next, the test printing process executed by the controller 11 at S110 of the process at receipt of print data illustrated in FIG. 2 will be described with reference to a flowchart in FIG. 6.

At S501, the controller 11 controls the printing device 16 to execute test printing of part of the print data on the basis of the raster data stored in the memory 112 at S102 in FIG. 2. Specifically, the controller 11 controls the printing device 16 to execute printing of a first page of the raster data.

Subsequently, at S502, the controller 11 executes the PDL data receiving process illustrated in FIG. 4 described above.

Subsequently, at S503, the controller 11 determines whether the receipt of PDL data succeeded on the basis of a result of the PDL data receiving process.

At S503, if the controller 11 determines that the receipt of PDL data succeeded (S503: YES), the controller 11 goes to S504, deletes the raster data stored at S102 in FIG. 2 from the memory 112, and then goes to S505, which will be described later.

At S503, if the controller 11 determines that the receipt of PDL data has failed (S503: NO), the controller 11 skips S504 and goes to S505.

At S505, the controller 11 allows the display device 13 to display a print confirmation screen to ask a user whether or not to print the rest of the print data after the test printing. In this embodiment, the print confirmation screen appearing on the display device 13 asks a user whether or not to print second and subsequent pages of the print data.

Subsequently, at S506, the controller 11 determines whether or not to execute printing of the rest of the print data after the test printing on the basis of the user's input on the print confirmation screen.

At S506, if the controller 11 determines to execute printing of the rest of the print data after the test printing (S506: YES), the controller 11 goes to S507.

At S507, the controller 11 controls the printing device 16 to execute printing of the rest of the print data after the test printing.

At S503, if the controller 11 determines that the receipt of PDL data succeeded, the controller 11 executes printing of the rest of the print data on the basis of the received PDL data. Specifically, the controller 11 generates raster data by applying a RIP process to the received PDL data, and executes printing of the rest of the print data on the basis of the generated raster data.

In contrast, at S503, if the controller 11 determines that the receipt of PDL data has failed, the controller 11 executes printing of the rest of the print data on the basis of the raster data stored at S102 in FIG. 2. After executing S507, the controller 11 ends the test printing process illustrated in FIG. 6.

At S506, if the controller 11 determines not to execute printing of the rest of the print data after the test printing (S506: NO), the controller 11 skips S507 and ends the test printing process illustrated in FIG. 6 without execution of printing of the rest of the print data.

2-1-4. Process at Error Occurrence

Next, the process at error occurrence executed by the controller 11 at S113 in FIG. 2 will be described with reference to a flowchart in FIG. 7.

When the controller 11 starts the process at error occurrence, the controller 11 executes a process of steps S601 to S603 and another process of steps S604 to S610 in parallel.

First, at S601, the controller 11 executes the PDL data receiving process illustrated in FIG. 4 described above.

Subsequently, at S602, the controller 11 determines whether the receipt of PDL data succeeded on the basis of a result of the PDL data receiving process.

At S602, if the controller 11 determines that the receipt of PDL data succeeded (S602: YES), the controller 11 goes to S603.

At S603, the controller 11 deletes the raster data stored at S102 in FIG. 2 from the memory 112, and then ends the process of steps S601 to S603.

In contrast, the process of steps S604 to S610 starts with S604, at which the controller 11 determines whether the error is cleared.

At S604, if the controller 11 determines that the error is not cleared (S604: NO), the controller 11 executes S604 again.

At S604, if the controller 11 determines that the error is cleared (S604: YES), the controller 11 goes to S605.

At S605, the controller 11 determines whether the printer 1 is receiving PDL data. If the PDL data receiving process at S601 has not ended or is in progress at execution of S605, the controller 11 determines that the printer 1 is receiving PDL data. In contrast, if the PDL data receiving process has ended at execution of S605, the controller 11 determines that the printer 1 is not receiving PDL data.

At S605, if the controller 11 determines that the printer 1 is receiving PDL data (S605: YES), the controller 11 goes to S606 and suspends the PDL data receiving process at S601.

Subsequently, at S607, the controller 11 resumes printing with the raster data stored in the memory 112 at S102, and then ends the process at error occurrence illustrated in FIG. 7.

At S605, if the controller 11 determines that the printer 1 is not receiving PDL data (S605: NO), the controller 11 goes to S608.

At S608, the controller 11 determines whether the receipt of PDL data succeeded on the basis of a result of the PDL data receiving process.

At S608, if the controller 11 determines that the receipt of PDL data succeeded (S608: YES), the controller 11 goes to S609, resumes printing with the PDL data, and then ends the process at error occurrence illustrated in FIG. 7.

In contrast, at S608, if the controller 11 determines that the receipt of PDL data has failed (S608: NO), the controller 11 goes to S610.

Figure 7:
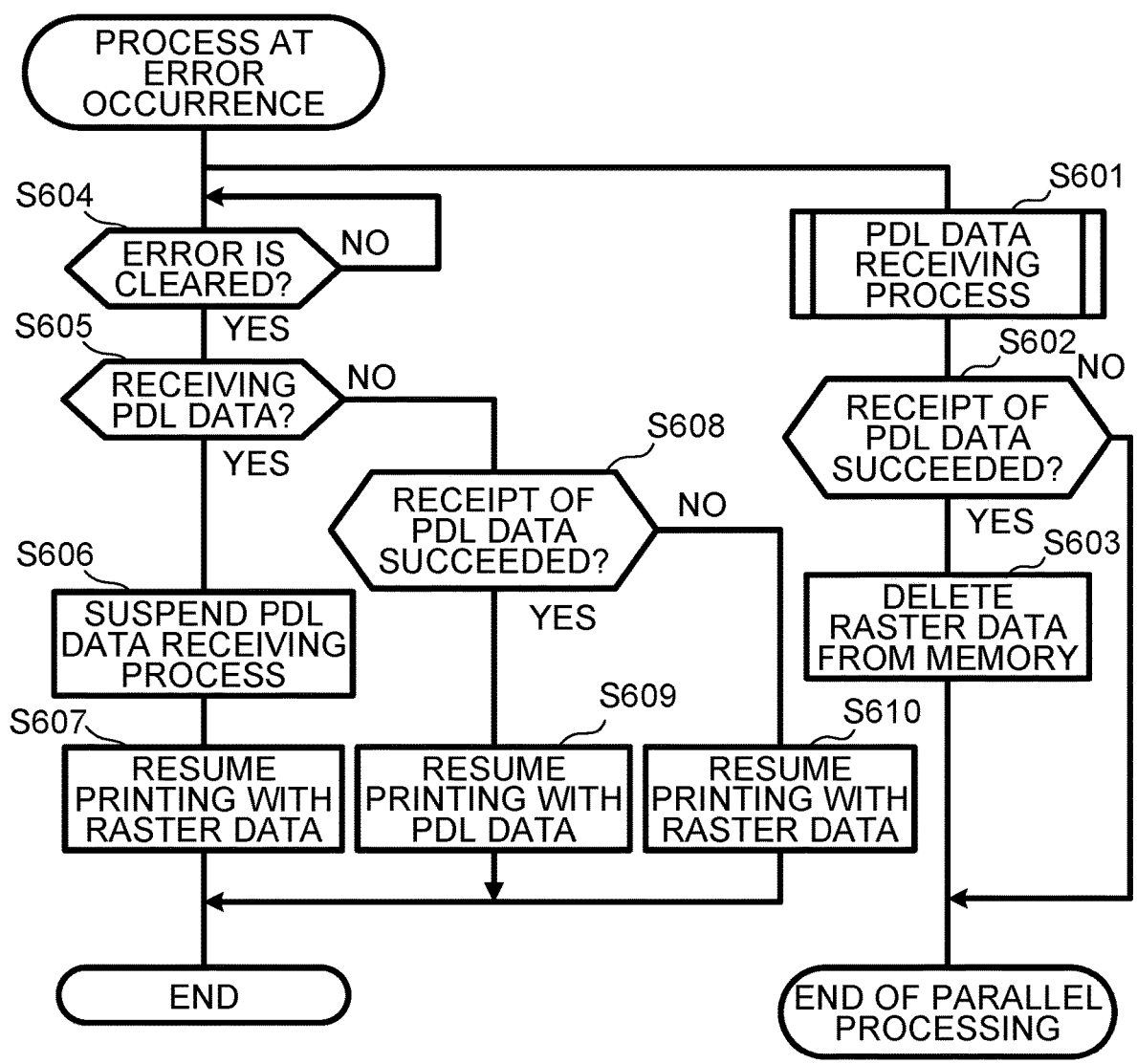
FIG. 7 is a flowchart of a process at error occurrence.

At S610, the controller 11 resumes printing with the raster data stored in the memory 112 at S102, and then ends the process at error occurrence illustrated in FIG. 7.

In other words, when the error is cleared, if the PDL data receiving process ends and the receipt of PDL data succeeds (S608: YES), printing with the PDL data is resumed. In contrast, when the error is cleared, if the PDL data receiving process is in progress (S605: YES), and if the PDL data receiving process ends but the receipt of PDL data fails (S608: NO), printing with the raster data is resumed.

2-2. Example

Next, an example of interaction between the printer 1 and the terminal 2 to be executed as a result of executing the process at receipt of print data illustrated in FIG. 2 will be described with reference to FIG. 8. In FIG. 8, interaction between the printer 1 and the terminal 2 is illustrated for when the print setting for the printer 1 is set to the storage print setting and when the print setting is not set to the storage print setting.

First, at time event T101, the terminal 2 sends, to the printer 1, a capability information request that requests sending of capability information. Capability information indicates processing capabilities of the printer 1 and includes data format information which indicates available print data formats in the printer 1. At T102, upon receipt of the capability information request from the terminal 2, the printer 1 sends capability information to the terminal 2.

Time events T201 to T208 described below are for when the print setting for the printer 1 is set to the storage print setting.

At T201, the terminal 2 sends print data to the printer 1. In this example, the print data to be sent is raster data.

Subsequently, at T202, the printer 1 stores the print data received from the terminal 2 in the memory 112. At T203, the printer 1 determines whether the received print data is PDL data. Here, the printer 1 determines that the received print data is raster data and the print setting for the printer 1 is set to the storage print setting.

Then, at T204, the printer 1 sends request information to the terminal 2. Upon receipt of the request information from the printer 1, the terminal 2, at T205, sends a response signal, which indicates the receipt of the request information, to the printer 1. In this example, the raster data is convertible into PDL data at the terminal 2. At T206, the terminal 2 sends PDL data to the printer 1. Upon receipt of the PDL data from the terminal 2, the printer 1, at T207, stores the PDL data received from the terminal 2 in the memory 112. At T208, the printer 1 deletes the stored raster data from the memory 112.

In contrast, time events T301 to T302 described below are for when the print setting for the printer 1 is not set to the storage print setting. The time events T301 to T302 follows the time events T101 to T102 described above.

At T301, the terminal 2 sends print data to the printer 1. In this example, the print data to be sent is raster data.

In addition, the print setting for the printer 1 is not set to the storage print setting nor the test print setting, and printing is not set with the glossy sheet setting. At T302, the printer 1 executes printing on the basis of the received raster data.

3. Effects

The above described embodiment has the following effects.

(1) In the above embodiment, in a case where print data received from the terminal 2 is raster data, the controller 11 of the printer 1 determines whether a particular condition, hereinafter referred to as a request information sending condition, is met. If the controller 11 determines that the request information sending condition is met, the controller 11 sends request information to the terminal 2. Upon receipt of PDL data from the terminal 2, the controller 11 allows the printing device 16 to execute printing on the basis of the PDL data.

Thus, in a case where the request information sending condition is met, in other words, the printer 1 is under a condition in which receiving PDL data is desirable, the printer 1 receives PDL data. In addition, the printer 1 receives print data in a data format appropriate for a state of the printer 1.

(2) In the above embodiment, in a case where the print setting for the printer 1 is set to a particular print setting, the controller 11 determines that the request information sending condition is met. That is, the controller 11 requests the terminal 2 to send PDL data in response to the print setting for the printer 1. Thus, the controller 11 receives print data in a data format appropriate for the print setting for the printer 1.

(3) In the above embodiment, in a case where the particular print setting is a storage print setting and the print setting for the printer 1 is set to the storage print setting, the printer 1 sends the request information to the terminal 2.

Thus, in a case where the print setting for the printer 1 is set to the storage print setting, the printer 1 sends request information to the terminal 2, the terminal 2 sends PDL data to the printer 1, and the printer 1 stores therein the PDL data received from the terminal 2. Generally, PDL data is less in the amount of data than raster data, if they have the same image. Thus, the above configuration enables reduction of the amount of data stored in the printer 1 compared with a case where raster data is stored in the printer 1.

(4) In the above embodiment, in a case where the particular print setting is a test print setting and the print setting for the printer 1 is set to the test print setting, the printer 1 sends request information to the terminal 2. The controller 11 executes test printing of early pages (e.g., a first page in this above embodiment) of print data on the basis of raster data received from the terminal 2. Then, the controller 11 executes printing of the remaining pages (e.g., a second and subsequent pages in the above embodiment) of the print data on the basis of PDL data received after sending the request information.

That is, the controller 11 executes test printing of the early pages of the print data on the basis of the raster data initially received from the terminal 2. This enables reduction of a first print out time (FPOT) compared with a case where the controller 11 executes test printing of the early pages of the print data on the basis of PDL data received after sending request information. As to the remaining pages to be printed, the amount of data that the printer 1 receives is low compared with a case when the printer 1 receives raster data.

(5) In the above embodiment, in a case where print data received from the terminal 2 is for a glossy sheet, the controller 11 determines that the request information sending condition is met.

The PDL data may include information on a profile (e.g., an ICC profile) used for color management. According to the above configuration, the controller 11 executes color management appropriately by comparing the ICC profile included in the PDL data, which is received from the terminal 2 after sending request information, with an ICC profile in the printer 1, thereby improving print quality for the printer 1 to print on a glossy sheet.

(6) In the above embodiment, the controller 11 determines that the request information sending condition is met in a case where an error occurs during execution of printing on the basis of raster data received from the terminal 2.

During an error occurrence, a print job is suspended. If the printer 1 has a job (e.g., a read job by the reading device 15) other than the print job at the error occurrence, the job may not be executed when the suspended print job has a large amount of data. According to the above configuration, the controller 11 sends request information to the terminal 2 as soon as an error occurs. The controller 11 thus stores PDL data received from the terminal 2 in the memory 112 of the printer 1. The amount of data stored in the printer 112 can be reduced compared with a case where raster data is stored in the printer 112. This enables allocation of memory space to store a job other than print data to be executed during an error occurrence, and reduces suspension of the job other than the print data.

4. Other Embodiments

While the disclosure has been described with reference to particular examples, various changes, arrangements and modifications may be applied therein without departing from the spirit and scope of the disclosure.

In some embodiments, for the test print setting with multiple copy printing, only some (e.g., a first copy) of multiple copies may be printed first, and then printing conditions may be changed or remaining copies (e.g., a second and subsequent copies) may be printed in accordance with a specified operation input through the input device 12.

Figure 6:
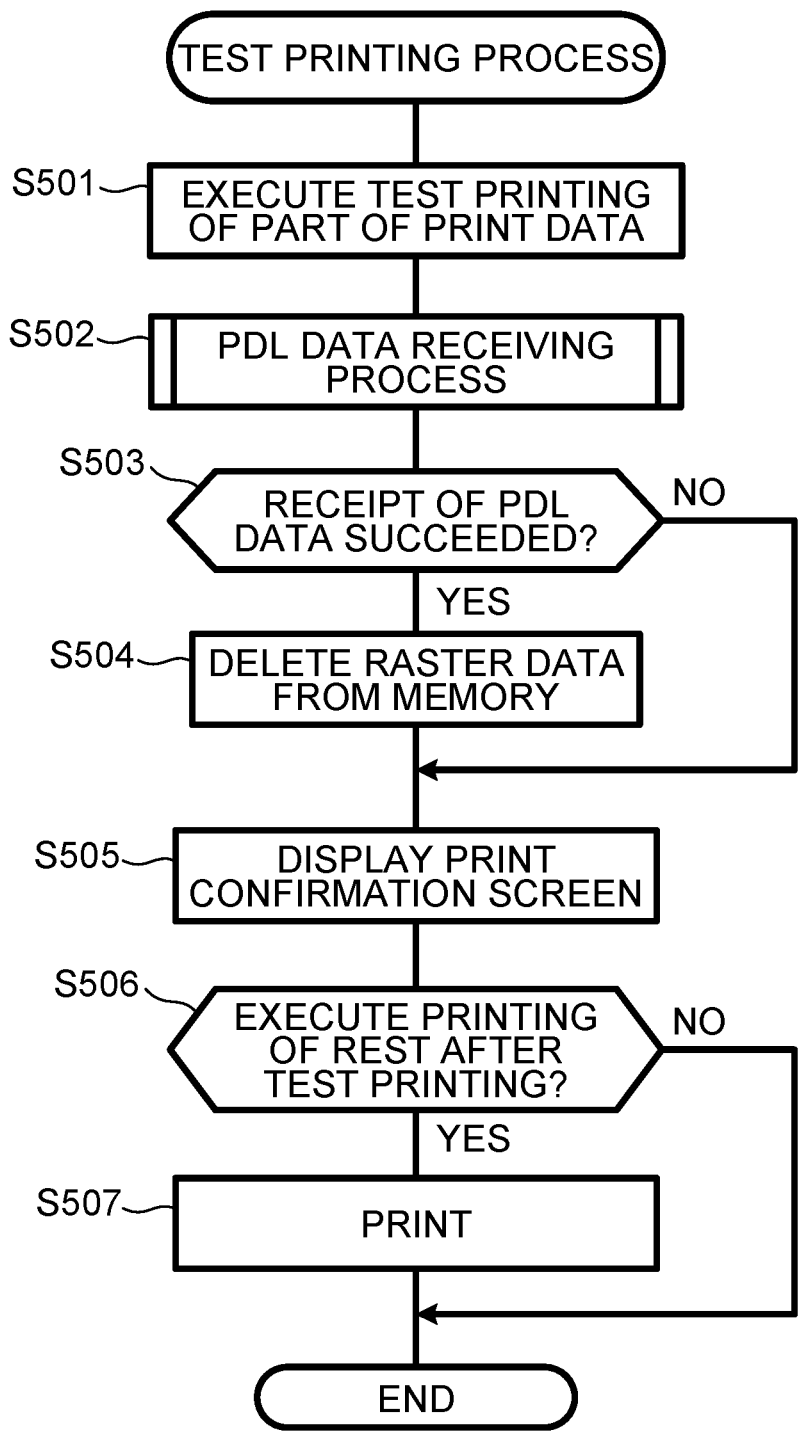
FIG. 6 is a flowchart of a test printing process.

In the test printing process illustrated in FIG. 6, the controller 11 may execute a step for executing test printing of part of print data (S501) and a step for executing PDL data receiving process (S502) in parallel.

In some embodiments, part or all of functions the controller 11 executes may be implemented hardware-wise by one or more devices such as ICs.

In some embodiments, multiple functions of a single element may be implemented by multiple elements, or a single function of a single element may be implemented by multiple elements. In some embodiments, multiple functions of multiple elements may be implemented by a single element, or a single function implemented by multiple elements may be implemented by a single element. In some embodiments, part of structures in the above embodiment may be omitted. In some embodiments, at least part of structures of the above embodiment may be added to structures of another embodiment or replaced therewith.

What is claimed is:

1. A printer comprises:
    an input device for receiving an input operation to the printer from a user;
    a memory;
    a printing device; and
    a controller configured to:
        receive print data from a terminal;
        determine whether the print data received from the terminal is raster data;
        in a case where the controller determines that the print data received from the terminal is not raster data, allow the printing device to execute printing on a basis of the print data received from the terminal; and
        in a case where the controller determines that the print data received from the terminal is raster data, determine whether a particular condition is met;
        in a case where the controller determines that the particular condition is met, send, to the terminal, request information that requests the terminal to send page description language (PDL) data; and
        after sending the request information to the terminal, when the controller receives the PDL data from the terminal, allow the printing device to execute printing on a basis of the PDL data,
    wherein the PDL data specifies types of drawing objects and drawing positions with commands.

2. The printer according to claim 1, wherein the controller determines that the particular condition is met in a case where a print setting for the printer is set to a particular print setting.

3. The printer according to claim 2,
    wherein the particular print setting is a storage print setting,
    wherein the storage print setting is a print setting for which the print data is stored in the memory until a print instruction is input to the input device.

4. The printer according to claim 2,
    wherein the particular print setting is a test print setting,
    wherein the test print setting is a print setting for first printing only some of pages of the print data or some of multiple copies of the print data, and then changing print conditions or printing remaining pages or copies of the print data in accordance with a specified operation input through the input device.

5. The printer according to claim 1,
    wherein the controller determines that the particular condition is met in a case where printing the print data is for a glossy sheet.

6. The printer according to claim 1,
    wherein the controller is further configured to:
        in a case where the print data received from the terminal is raster data, allow the printing device to execute printing on a basis of the raster data; and in a case where an error occurs during printing on the basis of the raster data, determine that the particular condition is met.

7. A non-transitory computer-readable medium provided in a printer, the printer comprising an input device for receiving an input operation to the printer from a user, a memory, a printing device, and a controller, the non-transitory computer-readable medium storing computer-readable instructions, the computer-readable instructions, when executed by the controller of the printer, causing the controller to perform:

receiving print data from a terminal;

determining whether the print data received from the terminal is raster data;

in a case where the controller determines that the print data received from the terminal is not raster data,
allowing the printing device to execute printing on a basis of the print data received from the terminal;

in a case where the controller determines that the print data received from the terminal is raster data,
determining whether a particular condition is met,
in a case where the controller determines that the particular condition is met, sending, to the terminal, request information that requests the terminal to send page description language (PDL) data; and
after sending the request information to the terminal, when the controller receives the PDL data from the terminal, allowing the printing device to execute printing on a basis of the PDL data, wherein the PDL data specifies types of drawing objects and drawing positions with commands.

* * * * *